Oct. 30, 1945. O. L. CATT 2,388,039
SCISSORS AND SHEARS SHARPENER
Filed Aug. 2, 1944

INVENTOR:
OTTO L. CATT
BY
ATTORNEY.

Patented Oct. 30, 1945

2,388,039

UNITED STATES PATENT OFFICE 2,388,039

SCISSORS AND SHEARS SHARPENER

Otto L. Catt, Oakland, Calif.

Application August 2, 1944, Serial No. 547,701

1 Claim. (Cl. 76—82.2)

This invention relates to scissors and shears sharpeners, and the chief object of the invention is to provide simple, efficient and practical means for sharpening such implements, and that may be easily and readily used and operated by individuals, even though not expert in such work.

A further object of the invention is to provide a scissors and shears sharpener including a flat and horizontally disposed table, means at the rear end of the table for releasably engaging a blade of a pair of scissors or shears and supporting the blade in proper position relative to the table for bevel sharpening the same, and a file with means on the handle thereof for slidably supporting the handle in proper spaced relation to the upper face of the table, said spacing corresponding to the spacing of the upturned edge of the scissors or shears blade above the table, as supported at the rear end of the table, and whereby the file may be moved and reciprocated smoothly and evenly over the cutting edge of the blade for sharpening same.

With the stated objects in view, together with such other and additional objects and advantages as may be pointed out in the specification, attention is directed to the accompanying drawing, wherein Figure 1 is a side elevation of the sharpener as in use, the scissors blade as releasably mounted at the rear end of the table being shown in section, the device being shown as resting upon a support.

Figure 1:
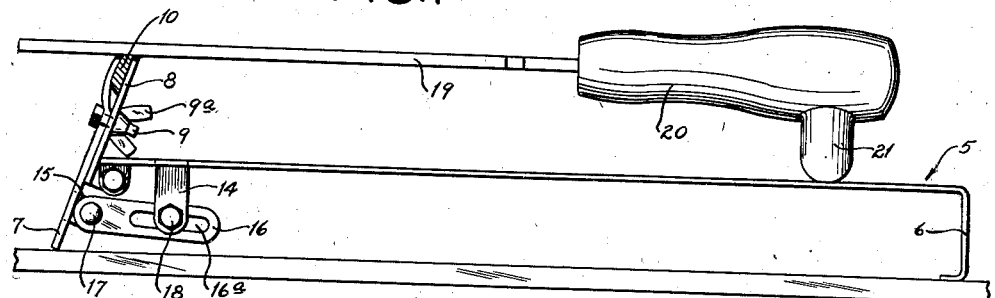
Figure 2:
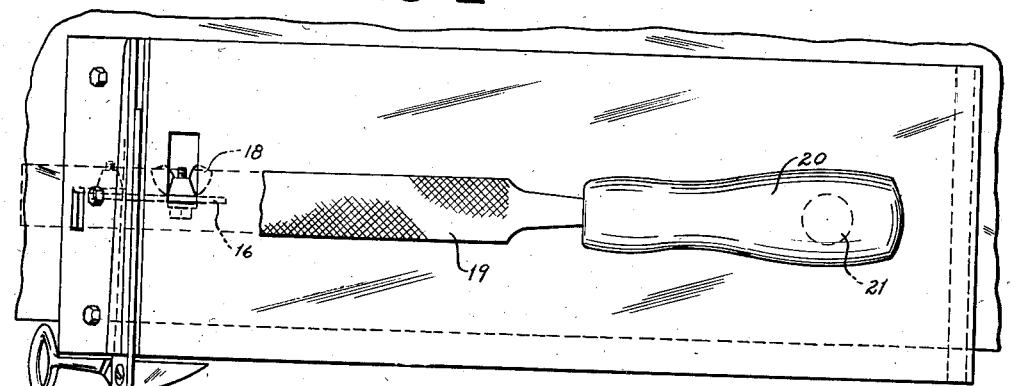
Figure 2 is a plan view of the assembly as shown in Figure 1, drawn on a somewhat enlarged scale.
Figure 4:
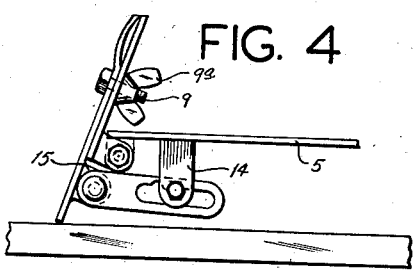
Figure 4 is a fragmentary view in side elevation of the mechanism at the rear end of the table for releasably and adjustably clamping and holding a scissors blade for sharpening.
Figure 3:
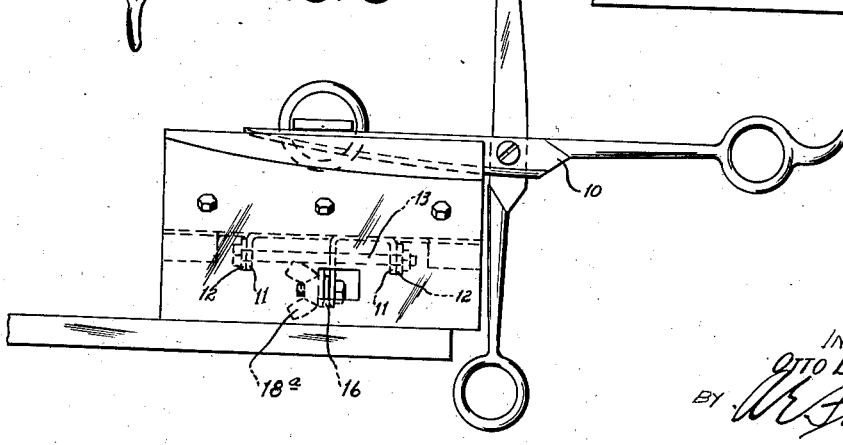
Figure 3 is a rear end elevation of the assembly of Figures 1 and 2.

The invention comprises a suitable oblong table represented generally at 5, and which is supported upon a down-turned end flange 6 at its forward end, and at its rear end by the down-ward extension of the outer clamp-plate 7. The clamp-plate 7 has its upper margin turned inwardly as indicated at 7a so as to enable this element to more closely conform to the contour of a shear or scissor blade in manner later to be pointed out. The clamp plate 7 is adjustably clamped to the inner clamp-plate 8 by means of short bolts 9 passed through the two plates and provided at their inner ends with thumb-nuts 9a, and by which arrangement the two plates tightened upon a shear or scissor blade 10 positioned edge upward between the upper margins of these plates. It is to be noted that the bolts 9 are spaced sufficiently below the upper edges of the plates to afford room for the insertion of the blade. Ears 11 are turned down in laterally spaced relation from the rear end of the table 5 and similar ears 12 are turned inwardly from the lower margin of the inner clamp-plate 8 and adapted to overlie the ears 11 of the table 5. A pivot bolt 13 is passed through the two sets of overlying ears 11 and 12, whereby the clamp-plates 7 and 8 are pivotally supported at the rear end of the table 5 and transversely thereof, and may be tilted more or less angularly to the surface of the table for a purpose to be described. An elongated tab 14 is struck out and turned down at the rear end of the table 5, inwardly spaced from the rear end thereof, and another tab 15 is similarly struck out at the lower margin of the outer clamp-plate 7 and is turned inwardly in longitudinal alignment with the tab 14. An adjustment link 16 is provided and is pivoted at 17 by its outer end to the tab 15, while the inner end of this link is adjustably connected to the tab 14 by means of a bolt 18 passed through the tab 14 and through an elongated slot 16a formed in the inner end of the link 16. The bolt 18 is provided with a thumb nut 18a. By this arrangement the clamp-plates 7 and 8 may be tilted to any desired angle and there locked by turning up the thumb nut 18a.

The sharpening element of the assembly consists of a file 19 provided with the handle 20, the latter having mounted at the under side thereof a slide-knob 21. The file is of the conventional flat type, and the knob 21 is of such size or length as to maintain the file blade when laid across the upper edges of the clamp-plates 7 and 8, in a substantially parallel relation to the surface of the table 5, and so that the file blade will move and reciprocate smoothly and evenly over these plates, without any up and down movement to the file, or at least the minimum amount of such motion that may be possible.

In use one of the blades 10 of the scissors or shears is positioned between the upper margins of the plates 7 and 8 with the cutting edge of the blade turned inwardly. The plates 7 and 8 are then tilted inwardly as may be required for sharpening the blade with the desired degree of bevel. The thumb-nuts 9a are then turned up for tightening the plates 7 and 8 upon the blade 10, and the thumb-nut 18a is turned up for locking the plates to the selected adjustment. The described mounting of the blade 10 is such that the upturned cutting edge is just exposed above the edges of the plates 7 and 8. The file blade 19 is then laid across the edge of the blade 10, and with the slide-knob 21 turned downward and bearing upon the surface of the table 5, the file is reciprocated back and forth over the cutting edge of the blade, thus sharpening same smoothly and evenly. In this operation the file is of course moved uniformly from end to end of the blade, so as to sharpen same equally from end to end.

While I have here shown and described a preferred embodiment of the invention, together with certain preferred structural features thereof, the embodiment shown as well as the several structural features thereof, may be changed in details as desired, within the scope of the claim.

I claim:

In a device of the kind described, a suitable oblong table having its forward end portion turned down to form a supporting flange at that end, inner and outer oblong clamp plates transversely and pivotally mounted at the rear end of the table, the outer clamp plate being extended down below the plane of the table correspondingly to the height of the down-turned portion of the forward end of the table, means for adjustably locking the outer plate in various angular relations to the surface of the table, and means for releasably clamping the inner and outer clamping plates together upon a shear blade or the like positioned longitudinally between the plates with the cutting edge thereof turned upwardly, the upper margin of the outer clamping plate being turned arcuately inward for more closely conforming to the contour of the blade, a sharpening file, and means extended from the file for slidable contact with the surface of the table, to maintain the file blade in substantially parallel relation to the surface of the table when the file blade is positioned across the cutting edge of the shear blade and reciprocated thereover for the purpose of smoothly and evenly sharpening the shear blade.

OTTO L. CATT.